May 27, 1952   J. A. RAJCHMAN   2,598,301
METHOD OF AND MEANS FOR INDICATING FREQUENCY
BY RESONANCE OF CHARGED PARTICLES
Filed Oct. 19, 1946   4 Sheets-Sheet 1

Inventor
Jan A. Rajchman

Attorney

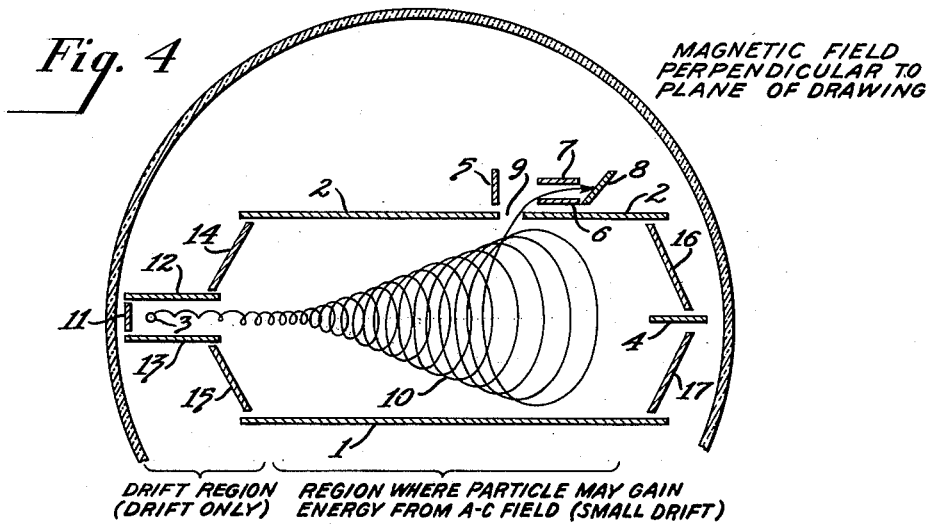
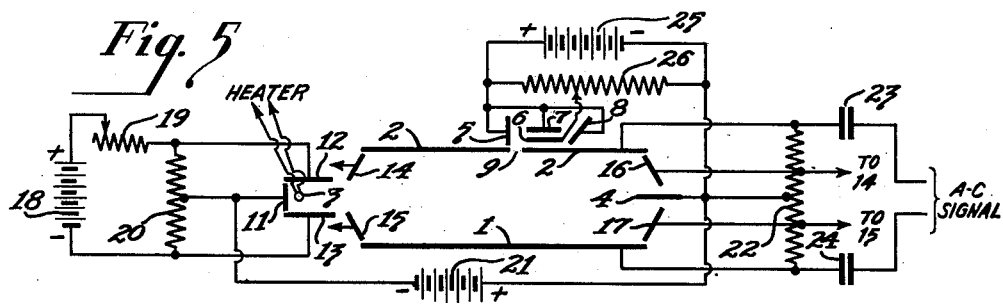
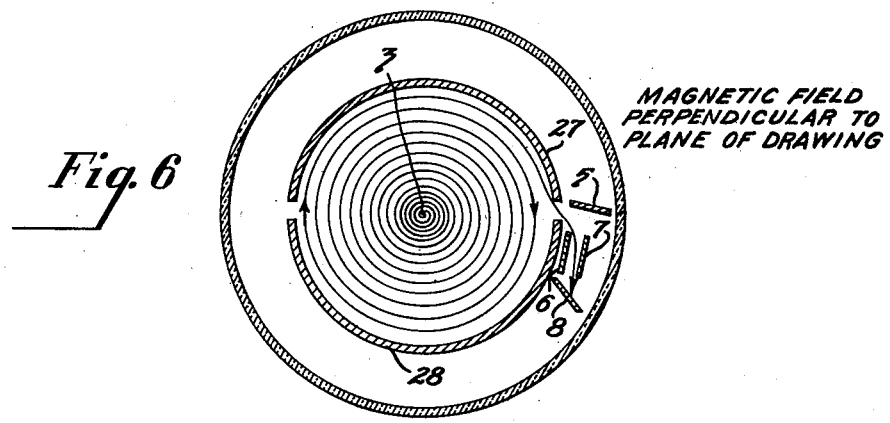

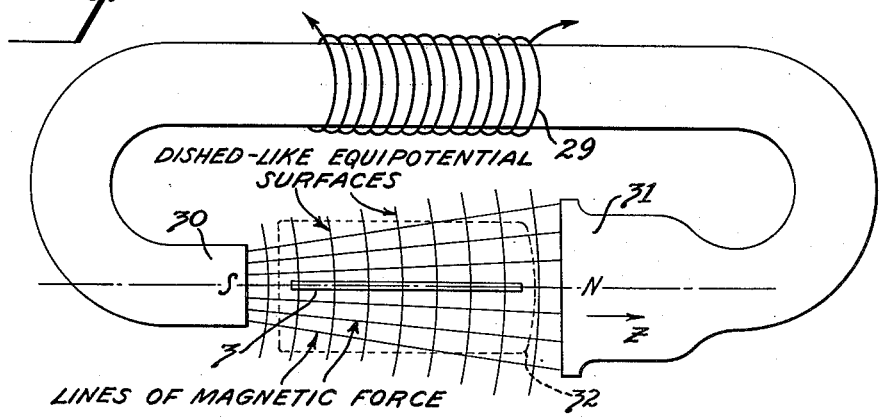
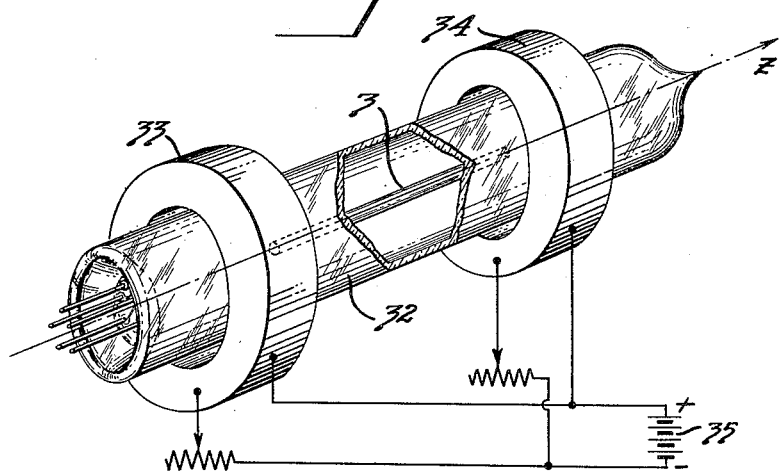

Inventor
Jan A. Rajchman
Attorney

Patented May 27, 1952

2,598,301

UNITED STATES PATENT OFFICE 2,598,301

METHOD OF AND MEANS FOR INDICATING FREQUENCY BY RESONANCE OF CHARGED PARTICLES

Jan A. Rajchman, Princeton, N. J., assignor to Radio Corporation of America, a corporation of Delaware Application October 19, 1946, Serial No. 704,349

8 Claims. (Cl. 315—21)

This invention relates to a method of and means for indicating the frequency components of an alternating wave by means responsive to the periodic motions or resonance of charged particles, such as electrons or ions, moving in combined magnetic and electric fields.

In many fields of application it is useful to analyze simultaneously all the frequency components of a complex wave. In this application a complex wave is construed to be either a single carrier frequency containing modulation components or one or more carrier frequencies lying in a given band. Most known devices operate by a time sequence or a scanning method in which the different frequency components are determined successively. The disadvantage of the previously known systems lies in the fact that intermittent frequency components may be missed if they do not coincide with the period during which the particular frequency is being investigated. It is therefore the primary purpose of this invention to provide a method of and means for simultaneously investigating the existence of component frequencies of a complex wave. A further object of this invention is to accomplish the above object by means of a discharge device which indicates the existence of one or more predetermined frequencies by means of electronic or ionic bombardment of a target electrode to produce simultaneous visual indications of the frequency components of the complex wave being analyzed.

In accordance with this invention, the above mentioned objects may be accomplished by way of example, by subjecting charged particles such as electrons or ions, to the influence of a magnetic field which is constant in time but non-uniform in space, and simultaneously to an electric field at an angle to the magnetic field which is uniform in space but varies in intensity in accordance with the wave to be analyzed.

It is well known that when a charged particle is located in a constant magnetic field of intensity H and an electric field of intensity E normal thereto and alternating at the "resonant" frequency $\omega_0$ the particle will be subjected to a force acting on it in such a direction as to increase constantly the energy of the particle provided that the angular frequency and the magnetic field are related in accordance with the following relationship:

$$\omega_0 = \frac{e}{m} H \qquad (1)$$

where $e$ and $m$ are the charge and mass of the particle respectively. This equation is the well-known "Cyclotron" equation. When the electric and magnetic fields are related in accordance with this equation the charged particles will be accelerated and may attain extremely high velocities. However, if the frequency of the alternating current has a value other than that indicated by Equation 1 the charged particles will periodically gain and lose speed so that the average energy will not change.

The above relationship is utilized in the present invention by providing a magnetic field which is non-uniform along an axis which coincides with the axis of the thermionic charged-particles-emitting body, such as a cathode for electrons or an anode for ions, so that for each frequency component of the electric field, within the range to be considered, there is within the tube at a predetermined location along the axis of the magnetic field a particular value of magnetic intensity (H) which satisfies Equation 1. At these particular locations the charged particles will therefore be caused to rotate in paths of ever increasing radius and may therefore be selected by a target electrode which is parallel to the axis of the source of particles, and will strike the target at a position which is indicative of the frequency.

It is therefore a further object of this invention to provide an improved frequency analyzer in which the component frequencies of a complex alternating wave are indicated by a visual trace produced at predetermined points along a target electrode.

From Equation 1 it may be seen that the resonant frequency of a charged particle is a function of its mass. Assuming a practical value of magnetic field intensity H, it is advantageous to utilize charged particles of large mass, such as ions, for the determination of relatively low frequencies, and particles of minimum mass, such as electrons, for the determination of the higher frequencies.

It is therefore a further object of this invention to provide a frequency indicator responsive to low frequencies by employing the resonant characteristics of free ions which are in mutually perpendicular magnetic and electric fields. It is a still further object of this invention to provide an indicator responsive to high frequencies operating under the same principle but employing electrons.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a perspective view of a discharge device in accordance with the present invention;

Figure 4 is an end view of an alternative embodiment of a frequency indicator.

Figure 5 is a circuit diagram illustrating the application of energizing potentials to the various electrodes of a frequency indicator;

Figure 6 is an end view of a discharge device of modified construction;

Figures 7 to 10 illustrate alternative methods of obtaining a non-uniform magnetic field.

Figure 1:
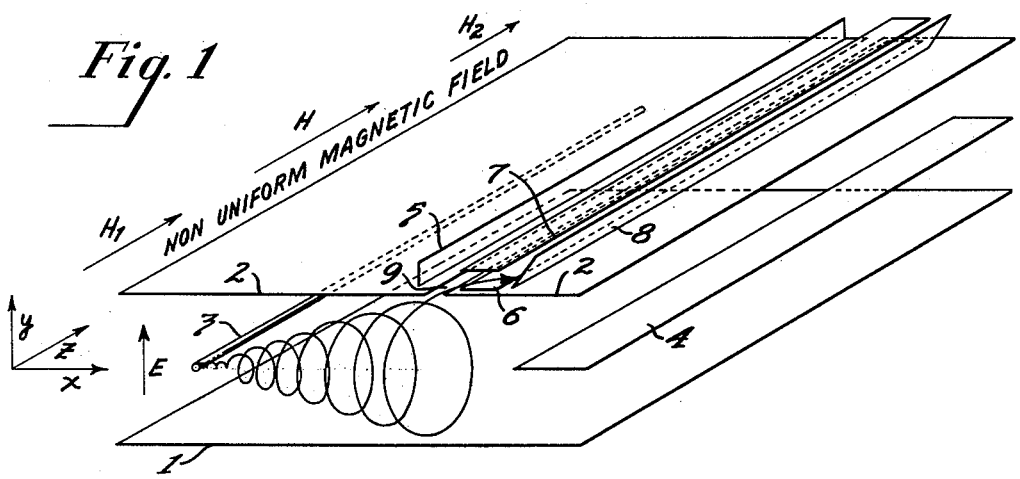

Referring to Fig. 1, the construction of a preferred embodiment of this invention is illustrated diagrammatically. Within an enclosed and evacuated glass envelope (not shown) there are located two opposed electrodes 1 and 2, rectilinear in shape, parallel to one another and lying in or parallel to the X—Z plane where X, Y and Z are three mutually perpendicular axes. Midway between the two electrodes 1 and 2, and parallel thereto, is located an elongated cathode 3 which may be seen to lie along the Z axis. The cathode 3 is located near one edge of the space enclosed by the two electrodes 1 and 2. At the opposite edge of the enclosed space, and lying in the same X—Z plane as the cathode, is the collector electrode 4, which may comprise a metallic rod or rectilinear strip of conventional electrode material. The upper electrode 2 is provided with a longitudinal aperture or opening which is parallel to the cathode 3 and coextensive with the length of the electrode. Adjacent the opening and above the upper electrode 2 there is provided a plurality of focussing electrodes 5, 6 and 7 and a target electrode 8. The purpose of these electrodes is to attract the charge particles which approach the opening in the electrode 2, and draw them through the opening and toward the target electrode 8 so that they will strike the latter electrode and produce a visual indication. Consequently electrode 8 is coated with a suitable fluorescent material of any conventional type adapted to produce a visual indication of the impingement of electrons or ions, as the case may be.

For the purpose of illustration it is assumed that the device is to be used for the indication of relatively high frequencies and that the source of charged particles is therefore an electron-emitting cathode 3. As will be described subsequently, element 3 may be a source of ions. The evacuated tube containing the electrode arrangement so far described is placed in a magnetic field whose direction coincides with the cathode or Z axis and which is constant in time but non-uniform at adjacent points along the length of the cathode 3. In addition to the magnetic field the electrons are subjected to an electric field whose direction is parallel to the Y axis, that is, perpendicular to the magnetic field. The electric field may include a D. C. component produced by applying suitable polarizing potentials to the electrodes 1 and 2. In order to retain the uniform field created by these electrodes which would exist in the absence of cathode 3 and collector 4, the latter are, by suitable connections, maintained at the potential which would exist in their absence, that is, the average potential of electrodes 1 and 2. The electric field E is therefore composed of a direct current component $E_0$ and alternating component $E_1$, the latter being proportional to the complex signal wave to be analyzed.

Figure 2:
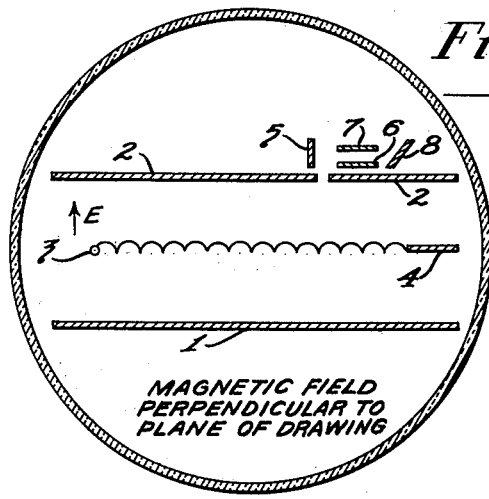
Figure 2 represents a cross-sectional view of a similar device illustrating the path of the charged particles in the absence of an alternating electric field.
Figure 3:
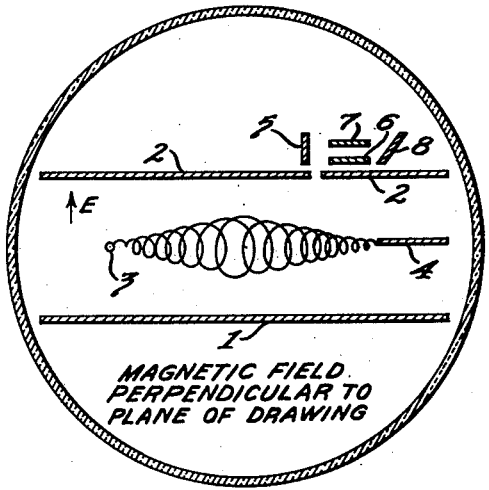
Figure 3 illustrates the path of the charged particles located in a magnetic field whose intensity does not satisfy Equation 1.

In any one plane perpendicular to the magnetic axis, the path of the electrons will be as illustrated in Figs. 1 to 3. Figure 2 is a simplified end view of the device taken on any X—Y plane, it being understood that the magnetic field is perpendicular to the drawing. Similar parts in Figs. 1, 2 and 3 have the same reference numerals and need not be described in detail.

Assuming that electrode 2 is positive and electrode 1 negative with respect to cathode 3, Fig. 2 illustrates the electron path resulting from the magnetic field existing at the point in question and the D. C. field along ($E_1=0$). After emission from the cathode the electron begins to move across the magnetic field towards the positive electrode 2. As is well known, however, it is immediately subject to a force perpendicular to the magnetic field and its velocity and therefore starts to follow a curved path which brings it eventually back to the D. C. potential existing midway between the two electrodes where, because its energy has been expended, it repeats the operation and follows a cycloidal path toward the positively charged collector electrode 4 which it ultimately strikes. It should be noted that the drift of the electrons is at all times in a direction perpendicular to the electric and magnetic fields.

It can be shown that the drift velocity $V_d$ is related to the electric field and the magnetic field in accordance with the following equation $$V_d = \frac{E_0}{H} \qquad (2)$$

It should be noted that the drift velocity is independent in sign and magnitude of the mass or the charge of the charged particle. Therefore it is the same for electrons as for positive or negative ions.

Referring to Fig. 3, it is assumed now that an alternating component has been added to the direct current voltage, but that the frequency $\omega$ is a frequency other than the resonant frequency determined by the relation of Equation 1 above. In this case the drift of the electron or its average velocity in the X direction, is the same as in the previous case. However, if the potential of electrode 2 becomes more positive as a result of the alternating component when the electron is moving toward that electrode, its energy will be increased. Also it follows that if the polarity of the alternating voltage changes when the electron is moving in the opposite direction, the electron will be accelerated again, this time toward electrode 2 and will again gain in energy and velocity. This acceleration will continue so long as there is an in phase component of the alternating voltage with respect to the motion of the electron. When the frequency gets out of phase with the electron it will be decelerated in the same manner and a portion of its energy will be given up. The velocity of the electron is thus accelerated and decelerated cyclically, but its average energy is not changed.

As previously stated, for a particular value of magnetic field the electron velocity will be such that a resonant condition will exist between the alternating voltage and the electron rotation and the electron will be continuously accelerated as shown in Fig. 1. The radius of the path of curvature then continuously increases as the electrons drift along the axis and, by suitable choice of the intensity of the plate potentials and the proper selection of the distance between the two electrodes, the electrons can be accelerated to a sufficient degree that they come within the influence of the electric field produced by the positive potential of electrodes 5, 6 and 7 and will therefore pass through the slit 9 in electrode 2 and will then be guided by electrodes 6 and 7 to the target electrode 8.

Since the direction of electron drift is at all times perpendicular to the electric and magnetic fields it will be understood that, broadly speaking, electrons or ions emitted from a given point on the cathode, or anode in the case of ions, along the Z or magnetic axis will tend to remain in a plane which is perpendicular to the Z axis. Because a magnetic field which is non-uniform along the Z axis necessarily has lines of force which diverge outwardly from the central axis, however, the actual course depends upon the direction of the magnetic field at all points between the cathode and the collector electrode. In general this will be a curved surface rather than a true plane, as will be discussed subsequently. Nevertheless the particles from a given point of origin along the source will arrive eventually at a given point on the target electrode. Thus it may be seen that only those particles which originate from a point on the source where the magnetic field satisfied the relationship of Equation 1 will be sufficiently accelerated to reach the target and that these particles will strike the target at a given point which is then indicative of the frequency, or a component frequency, at the applied voltage. Since the particles are simultaneously emitted along the entire length of the cathode, those which satisfy Equation 1 for each frequency component of the complex wave will simultaneously be directed to the target electrode to produce visible indications at spaced points along its length. Therefore all the component frequencies of the alternating waves applied to electrodes 1 and 2, within the band of frequencies determined by the range of magnetic field intensity, will be indicated. The device may then be calibrated by applying known frequencies to the electrodes 1 and 2 and suitably marking the position on the target electrode 8 at which a fluorescent spot appears for each frequency.

A modified arrangement is illustrated in Fig. 4, which is a plan view perpendicular to the Z or magnetic axis, it being understood that all the elements extend in depth in a direction perpendicular to the plane of the drawing. In addition to the elements shown and described above in connection with Figs. 1 to 3 which bear the same reference numerals in Fig. 4, there is now provided four additional electrodes 14, 15, 16 and 17 which are designed so as to enclose the area within the electrodes 1 and 2 to prevent the dispersion of electrons. These elements, which may be termed end plate electrodes may, also, be used to control the drift and the A. C. field. In addition, accelerating the electrodes 11, 12 and 13 are provided adjacent the cathode 3 and enclosing it on three sides. By applying suitable D. C. potentials to the latter electrodes the electrons emitted from the cathode are given an initial velocity into the region of the tube proper, that is, the space between electrodes 1 and 2. The particular advantage of the type of construction illustrated in Fig. 4 lies in the fact that the emission of electrons, or ions, from a heated cathode or anode is efficient only when the electric field is fairly strong at the surface of the cathode. However, if this field were produced by the application of large potentials to the main electrodes 1 and 2, the drift velocity of the particle in the X direction would be very large and this would require a tube of large dimensions, since sufficient time must be given to build up an appreciable velocity of rotation before the electron strikes the collecting electrode 4. It will be understood that the longer the time that the alternating field has to affect the rotation of the electron the greater will be its ultimate rotational velocity and the greater its radius of curvature. If the drift velocity is so great that the electron passes through the device before its rotating velocity has been sufficiently built up it will prevent the electrons from passing through the gate and striking the target. Furthermore, the ability of the device to discriminate between two frequencies of approximately the same value depends upon the number of times the particle is made to rotate while gaining its energy. The discrimination of the tube, that is, its ability to select electrons moving under the influence of closely related frequencies, therefore requires the drift to be sufficiently low to permit the electrons to rotate a large number of times. This requirement dictates that a small D. C. potential on electrodes 1 and 2 be employed. The accelerating electrodes therefore make possible high cathode emission without unduly increasing the electron drift.

Fig. 5 is a circuit diagram showing typical connections to a device of the type illustrated in Fig. 4. Obviously the device of Fig. 1 will be connected similarly except that the connections to the electrodes which are not used in the latter device would be eliminated. A battery 18 provides the potential for the accelerating electrodes 12 and 13, the voltage being adjusted by means of a variable resistor 19. A potentiometer 20 connected across the source of voltage, and having its midpoint connected to cathode 3, is employed to keep the cathode at the average potential of electrodes 12 and 13. Battery 21, having a value of a few volts, is connected between cathode 3 and the collecting electrode 4 to provide a collecting field for electrons which do not pass through the aperture to the target. Battery 25 supplies potentials for the collector electrodes 8 and the electrodes associated therewith for directing the electrons through the aperture. These electrodes are maintained at a positive value with respect to cathode, electrode 6 being at a somewhat less positive value than the opposite electrode 7 in order to control the path of the electrons in accordance with well-known practices. The indicated polarity of batteries 21 and 25 with their negative terminals connected to cathode is for the case in which the tube utilizes electrons. The polarities would be reversed for a tube utilizing ions. The polarity of battery 18 is the same in either case and its polarity depends only upon the direction of the magnetic field, which is assumed to be, in the present case, into the plane of the figure. The A. C. signal to be analyzed is coupled to the device through capacitors 23 and 24 and to a voltage divider 22 from points on which connections are made to the electrodes 1, 2 and 14 to 17 inclusive.

A further alternative embodiment is illustrated in Fig. 6 in which, as before, the non-uniform magnetic field is assumed to be perpendicular to the plane of the figure. In this case the tube consists of two opposed electrodes 27 and 28 which are in the form of two semi-cylindrical surfaces with their edges adjacent. One of the spaces between adjacent edges constitutes the aperture through which the electrons are directed to the target electrode 8 by the associated electrodes 5, 6 and 7 which control the path of the electrons after they have passed through the aperture. The cathode 3 is concentrically located within the outer electrodes 27 and 28. It will be noted that the structure is much like that of a conventional magnetron except for the target electrodes and the fact that the magnetic field is non-uniform along the axis of the cathode. The alternating voltage to be analyzed is applied between electrodes 27 and 28 and no D. C. drift voltage is used. The trajectory of the electrons is in the form of an expanding spiral about the cathode. In the Z directions end plates connected to the respective section of electrodes 27 and 28 may be employed. Alternatively separate end plate electrodes which may be polarized independently of the main electrodes may be employed.

As in the preceding case, it will be appreciated that electrons which are positioned along the axis of the cathode so that the magnetic field to which they are subjected together with the electric field produced by the applied voltage, results in one or more resonant conditions so that the electrons in certain regions are continuously energized and ultimately reach the outer limits of the device and come into the influence of the collector field and then to the collecting target electrode.

Electrons located in the regions where the magnetic field does not fulfill the resonant condition will be alternately energized and deenergized and will rotate in larger and then smaller circles and will not reach the collector electrode. However, these electrons may drift along the Z axis under the influence of the magnetic field and the space charge created by the particles in the area, until they arrive in a region where the magnetic field has the intensity required to establish resonance and they will then join the other electrons to effectively increase the electron current at the resonant position.

There are various ways of producing the required non-uniform magnetic field. One of these is illustrated in Fig. 8. A permanent or an electromagnet may be employed which may include a coil 29, in the latter case, and a suitably shaped iron core having opposed pole pieces 30 and 31 which are different in diameter. The tube 32 is located between the opposed poles of the magnet in such a position that the cathode 3 coincides with the line joining the center of the two poles. The magnetic lines of force through the cathode are therefore substantially straight lines while at positions radially outward from the cathode in a direction perpendicular thereto, the lines of force tend to diverge outwardly, thus effectively decreasing the field intensity at adjacent points along the cathode in the direction of the Z axis.

An alternative method of producing a non-uniform magnetic field is illustrated in Fig. 8. In this case two coils 33 and 34 are provided. These coils are doughnut shaped and of such a size that the tube 32 lies within the open centers of the two coils, and the cathode 3 coincides with their common axis. In order to provide the non-uniform field the two coils are unequally energized; for example, coil 34 being applied with a larger energizing current from battery 35 than is coil 33. The adjustment is accomplished by suitable variable resistors.

Figure 9:
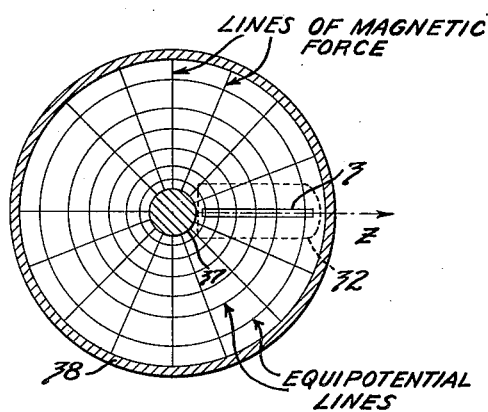
Figure 10:
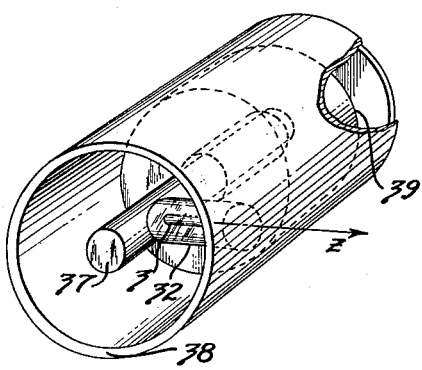

Figs. 9 and 10 show in plan view and in perspective, respectively, a further alternative arrangement in which the non-uniform magnetic field is produced between two concentric cylinders 37 and 38 of high magnetic permeability. The cylinders may either be permanent magnets or may be energized by a coil 39 mounted within the outer cylinder 38. The two cylinders are preferably connected at one end by material of high magnetic permeability in order to complete the magnetic circuit.

A tube is mounted between the concentric cylinders 37 and 38 so that the axis of the cathode lies on the common radius of the cylinders and perpendicular to the inner cylinder. The magnetic lines of force extend radially between the two cylinders and thus surround and coincide with the axis of the cathode. The region adjacent the cathode lies in an area where the lines of force are divergent and therefore the magnetic field is non-uniform along the Z axis. The so-called "equi-potential" lines of the magnetic field are circular and define sections of the surface of a cylinder. The electron trajectory will lie substantially in the cylindrical surface rather than in the plane, as indicated above. One advantage of the cylindrical magnetic structure illustrated in Figs. 9 and 10 is that a number of frequency analyzer tubes may be utilized with a given magnetic structure. These may be useful, for example, where the frequency coverage of a single tube is not sufficient to cover the desired range, the different tubes being designed to utilize charged particles of different masses selected for the ranges to be covered.

The physical dimensions of the tube depend upon the particular application and the nature of the charged particle. As indicated above, electrons are preferred where relatively high frequencies are to be indicated, while ions are preferred where lower frequencies are to be indicated. Also, as indicated above, the size of the tube depends upon the discrimination or selectivity required, and the discrimination, in turn, has been shown to depend upon the number of revolutions and thus the ultimate radius of the path of the charged particle. It can be shown that where there is no initial velocity and no constant field that the particle will start gaining energy regardless of the phase of the electric field at the starting point and will describe a curve resembling a spiral. For a sufficiently large time $t$ and for any frequency $\omega$, the value of the radius $R$ of the particle trajectory will be given by the equation $$R = \frac{E_1}{\Delta\omega \cdot H} \sin \frac{\Delta\omega t}{2} \qquad (3)$$

where $\Delta\omega = \omega - \omega_0$

At the resonant frequency $\omega = \omega_0$, this relation becomes $$R = \frac{E_1}{2H} t \qquad (4)$$

Also, the particle moving on the trajectory whose radius is R will have an energy $$\tfrac{1}{2}mV^2 = \tfrac{1}{2}m\omega^2 R^2 \qquad (5)$$

which can be expressed in electron volts, taking into account Equation 1

$$V = \tfrac{1}{2}\frac{e}{m}H^2R^2 \qquad (6)$$

or $$V_{\text{volts}} = .089 H^2_{\text{gauss}} R^2 e m$$

It can also be shown that a particle will have made $n$ turns in a time $t$ when $$t = \frac{2\pi n}{\omega} \qquad (7)$$

and the radius of curvature for this is $$R = \frac{E_1}{H}\frac{\sin 2\omega n\frac{\Delta\omega}{\omega}}{\Delta\omega} = \frac{E_1}{H}\frac{2\pi n}{\omega}\frac{\sin u}{u} \qquad (8)$$

where $$u = \frac{2\pi n}{\omega}\Delta\omega$$

From the relations stated above the radius of curvature which is reached after the electrons have made $n$ turns can be calculated and this will control the dimensions of the tube.

It can also be shown that the energy V expressed in electron volts of a charged particle other than an electron of charge $e$ and mass M resonating in an alternating field of frequency $f$ cycles whose trajectory has a radius R centimeters in a magnetic field H gauss is given by the following relation $$V = 1.12 \cdot 10^{-14}\frac{m}{M}R^2f^2 \qquad (9)$$

where $m$ is the mass of an electron. The resultant relation between magnetic field and frequency therefore is $$f = \frac{m}{M}2.81 \cdot 10^6 \cdot H \qquad (10)$$

From the above equation for a given value of magnetic field and desired operating frequency the mass M of the particle best suited to resonate may be determined. Charged particles having the desired mass may be selected from the known ions based on their atomic weights. However, the choice of the ion will depend to a large extent upon the type of ion source which is available practically. Ions of Lithium may be conveniently obtained by heating the material known commercially as Spodumene as described by J. P. Blewett and E. J. Jones in Physical Review, vol. 50, September, 1936, page 464. This material may be ground to a fine powder mixed with amylacetate and painted on an ordinary cathode nickel tubing or placed with an open-sided receptacle and brought to the required temperature by well known means. Because the liberation of lithium ions by this method also releases oxygen from the spodumene, it was found necessary to connect the tube to a continuous vacuum pump which is operated to reduce the pressure within the tube to the greatest extent possible.

Figure 11:
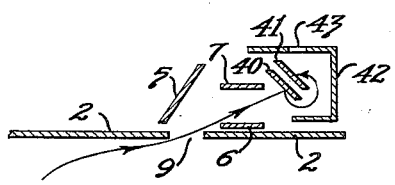
Figures 11 to 13 are views of alternative forms of construction of the target electrode.

When ions are used in the frequency indicator certain modifications of the target electrode are advisable. The luminous efficiency of fluorescent material bombarded by ions is smaller than it is for electrons. However, for most materials, the bombardment by positive ions produces secondary electrons. To improve the luminous efficiency when ions are used, therefore, the secondary electrons which are produced by ionic bombardment can be accelerated and made to strike the fluorescent screen as illustrated in Fig. 11, which shows on an enlarged scale the target electrode and associated electrodes used to control the path of the ions. As before, the accelerated ions pass through the aperture 9 between the portions of the electrode 2. When they come into the influence of the electric field which extends through the aperture from the negative potential of electrode 5 the ion then takes a more or less straight path through electrodes 6 and 7 and strikes a secondary emissive electrode 40 which is also maintained at a high negative potential with respect to electrode 2. Secondary electrons which are emitted from the surface of electrode 40 then follow a curved path and strike electrode 41 which is maintained at about the same potential as electrode 2. The curved path results from the combined effect of the magnetic field and the electric field produced by the shielding electrode 42. Electrode 41 is coated with a conventional fluorescent material which gives off light when it is struck by the electrons and this may be observed through a suitable window 43.

Figure 12:
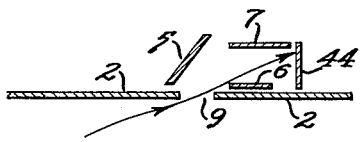

An alternative embodiment illustrated in Fig. 12 modifies the foregoing target electrode arrangements in that the target consists of a transparent dielectric material such as glass or mica. Fig. 12 is particularly adapted for use with electrons which strike the inner surface of the transparent target 44, coated with a suitable fluorescent material on its inner surface to produce an indication which may be viewed from the rear.

Figure 13:
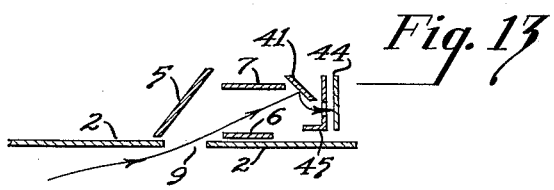

Fig. 13 shows a similar embodiment having particular utility for ionic bombardment in which the ions are directed toward the target electrode 41 which is secondarily emissive and the secondary electrons then are directed by electrode 45 to a transparent fluorescent screen 44.

From the equations given above the frequency range of operation may be determined for practical values of the magnetic field. Assuming a magnetic field of 20 gauss as a lower limit an electronic frequency analyzer would have a lower limit in frequency of approximately 50 megacycles. The upper limit is determined by the practical difficulty of obtaining a strong magnetic field. However, for a field of the order of 10,000 gauss, which is a practical value, the resonant frequency would be 28,000 megacycles, corresponding to a wavelength of approximately 1 cm. In the case of the ionic frequency indicator, considering the lightest practical ion, which is hydrogen, the lower limit of frequency can be shown to be approximately 200 kilocycles for a magnetic field of 250 gauss and assuming the trajectory of the ion to be one inch in diameter. The lithium ion would lower the resonant frequency since it has greater atomic weight and for a magnetic field strength of the order of 500 gauss would produce a resonant frequency just over 100 kc. It will be apparent that where still lower frequencies are desired which are not practical to indicate by direct methods, that conventional beat frequency methods may be employed. That is, a high frequency carrier signal can be modulated by the low frequency wave which it is desired to analyze and the indication will then show the component side band frequencies which may be used to determine the frequency of the modulating signal.

What I claim is:

1. In a device of the character described, an elongated source of free charged particles, means for establishing a magnetic field parallel to and surrounding said source, the intensity of said field being constant in time but increasing in intensity along the length of said source, electrode means for establishing an electric field perpendicular to said magnetic field, and means for applying to said electrode means potentials corresponding to an alternating wave whose frequency is to be determined, and a target electrode parallel to and coextensive with said source.

2. In a device of the character described, a pair of spaced electrodes, means for applying energizing potentials, including an alternating potential whose frequency is to be determined, to said electrodes to establish electrical fields therebetween, an elongated thermionic charged-particles emissive body positioned equidistantly between said electrodes and parallel thereto, means for establishing a steady magnetic field between said electrodes parallel to said body, at an angle to the electrical fields therebetween and increasing in intensity in space from one end of said body to the other, and a target electrode including a fluorescent material parallel to and co-extensive with said body and positioned in spaced relation thereto for receiving accelerated charged particles from said body through said fields.

3. In a device of the character described, means for establishing free charged particles along the axis of a magnetic field of non-uniform intensity, means for establishing a high frequency electric field at an angle to and surrounding said magnetic field, and means responsive to the activity of those particles located in the combined electric and magnetic field having a predetermined relation.

4. A device of the character described in claim 3 in which said predetermined relation is $$\omega = \frac{e}{m} H$$

where $\omega$ is the frequency of said electric field, $e$ and $m$ are the charge and mass of said particles, respectively, and $H$ is the intensity of said magnetic field at the particular location.

5. A device of the character described comprising in combination, an elongated source of free charged particles, means for establishing a magnetic field parallel to and surrounding said source, the intensity of said field being constant in time but increasing in intensity at successive points along the axis of said source, electrode means for establishing a high frequency alternating electric field perpendicular to said magnetic field and substantially coextensive with said source, additional electrode means for drawing said particles away from said source in a direction perpendicular to said magnetic and electric fields, and an elongated output electrode positioned so that particles moving in cycloidal paths of predetermined radius will impinge on said electrode, and means for indicating the point on said output electrode at which said impingement occurs.

6. A device of the character described comprising a pair of spaced electrodes having opposed surfaces, an elongated thermionic charged particles emissive body positioned equidistantly between said electrodes and parallel to said surfaces, means for establishing a magnetic field between said electrodes parallel to said body, said magnetic field being constant in time but increasing in intensity at successive points along said body, a collector electrode parallel to and coextensive with said body, and a target electrode parallel to and coextensive with said body and positioned outside of the plane including said body and said collector.

7. A device of the character described in claim 6 in which said target electrode includes a fluorescent material.

8. A device of the character described in claim 6 which includes an accelerating electrode adjacent said body.

JAN A. RAJCHMAN.

REFERENCES CITED

The following references are of record in the file of this patent:

UNITED STATES PATENTS

| Number | Name | Date |
|---|---|---|
| 2,372,328 | Labin | Mar. 27, 1945 |